(12) United States Patent
Popick et al.

(10) Patent No.: US 7,107,181 B2
(45) Date of Patent: Sep. 12, 2006

(54) METHODS, SYSTEMS, AND STORAGE MEDIUMS FOR MAINTAINING TIMING SUPPLIES AND ASSIGNMENTS

(75) Inventors: Michael L. Popick, Marietta, GA (US); David J. Robinson, Chelsea, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 14 days.

(21) Appl. No.: 10/880,187

(22) Filed: Jun. 29, 2004

(65) Prior Publication Data

US 2005/0288880 A1    Dec. 29, 2005

(51) Int. Cl.
*G01R 25/00* (2006.01)
(52) U.S. Cl. ..................................... 702/177
(58) Field of Classification Search ................ 702/177
See application file for complete search history.

(56) References Cited

U.S. PATENT DOCUMENTS 6,725,032 B1 *   4/2004   Sheridan et al. ............ 455/419
2002/0031205 A1 * 3/2002   Kicklighter et al. ..... 379/32.01

OTHER PUBLICATIONS

U.S. Appl. No. 10/648,751, filed Aug. 25, 2003, Popick et al.
U.S. Appl. No. 10/729,403, filed Dec. 5, 2003, Lyles et al.

* cited by examiner

*Primary Examiner*—Bryan Bui
*Assistant Examiner*—Tung S. Lau
(74) *Attorney, Agent, or Firm*—Cantor Colburn LLP

(57) ABSTRACT

Exemplary embodiments include methods, systems, and storage mediums for managing clock timing assignments and usage. The method includes selecting a timing source from a selection of timing equipment associated with telecommunications equipment. The timing source is selected from one of a composite clock card and a T1 card. The method also includes performing a function on the timing source. The function includes at least one of an assignment, tracking usage, and search or analysis.

6 Claims, 10 Drawing Sheets

Shelf Maintenance

Location
- ENTITY: GA
- COMPONENT: GA
- CLLI: RDCTESTCLLI
- SYSTEM: MASTER
- SYSTEM SHELF: 2
- SYSTEM USE: PRIMARY

Bay Location
- Floor: 01
- Relay Rack: 101
- Bay: 01
- Floor-RR-Bay: 01101.01
- Shelf: 2

Type — 502
- System Type: DCD-400
- Use: PRIMARY
- Sonet Compatible: ☐
- TEO:
- Appx: 0
- Eff. Date: 1/16/2000
- Place Date: 1/16/2001
- Note:

Fuse Assignments
- Fuse A
- Fuse B

[Update] — 504
[Move Shelf] — 506

METHODS, SYSTEMS, AND STORAGE MEDIUMS FOR MAINTAINING TIMING SUPPLIES AND ASSIGNMENTS

FIELD OF THE INVENTION

The present disclosure relates generally to telecommunications equipment management and more particularly, to methods, systems, and storage mediums for maintaining timing supplies and assignments in a telecommunications network environment.

BACKGROUND OF THE INVENTION

The efficient administration of synchronization timing assignments and supplies is essential for achieving success in the telecommunications industry. For example, in a central office environment, composite clock cards and T1 cards must be inventoried and assigned. In addition to these standard timing assignments, SONET compatibility, and stratum levels must also be extensively inventoried.

Mechanized and manual systems are used to capture information on timing equipment supplies and assignments. These mechanical systems are limited in functionality (e.g., there are no regional methods and procedures for usage; local sporadic and inconsistent usage deters accurate representations of the actual inventory resulting in delays in the services, etc.). The issue of timely service provisioning for customer requirements may be jeopardized without a means to track and manage this information. As new capacity and new configurations for equipment are developed and deployed, the inaccuracies of assignment tracking may grow.

What is needed, therefore, is a way to efficiently manage timing equipment supplies and assignments.

SUMMARY OF THE INVENTION

Exemplary embodiments of the present invention include methods, systems, and storage mediums for maintaining timing supplies and assignments in a telecommunications network environment. Methods include selecting a timing source from a selection of timing equipment associated with telecommunications equipment. The timing source is selected from one of a composite clock card and a T1 card. Methods also include performing a function on the timing source. The function includes at least one of an assignment, tracking usage, and search or analysis.

Other exemplary embodiments of the present invention include systems for maintaining timing supplies and assignments in a telecommunications network environment. Systems include a host system and a storage device in communication with the host system via a network. The storage device stores timing equipment data. Systems also include a user system in communication with the host system and a synchronized tracking application executing on at least one of the host system and the user system. A user accesses the synchronized tracking application to select a timing source from a selection of timing equipment associated with telecommunications equipment. The timing source is selected from one of a composite clock card and a T1 card. The user performs a function on the timing source via the synchronized tracking application. The function includes at least one of an assignment, tracking usage, and search or analysis.

Further exemplary embodiments of the present invention include storage mediums for maintaining timing supplies and assignments in a telecommunications network environment. Storage mediums include instructions for causing a host system to implement a method. The method includes selecting a timing source from a selection of timing equipment associated with telecommunications equipment. The timing source is selected from one of a composite clock card and a T1 card. Methods also include performing a function on the timing source. The function includes at least one of an assignment, tracking usage, and search or analysis.

Other systems, methods and/or storage mediums according to exemplary embodiments will be or become apparent to one with skill in the art upon review of the following drawings and detailed description. It is intended that all such additional systems, methods, and/or storage mediums be within the scope of the present invention, and be protected by the accompanying claims.

BRIEF DESCRIPTION OF THE DRAWINGS

Referring to the exemplary drawings wherein like elements are numbered alike in the several FIGURES:

FIG. 5 is a sample user interface screen for performing shelf maintenance in exemplary embodiments;

DETAILED DESCRIPTION OF THE INVENTION

Exemplary embodiments include a method for providing a standardized process for planning, assignments, and tracking usage on synchronization timing equipment such as that deployed in a central office of a telecommunications network environment. The method may be utilized by capacity management organizations within a telephone company to plan and manage equipment used in central offices and other associated locations. In addition, exemplary embodiments of the present invention may be utilized by agencies contracted by the telephone company to perform work activities that have been outsourced. Further, other organizations within the telephone company may utilize the look-up and search capabilities of exemplary embodiments of the present invention for analyzing current and future job projects occurring in a given location. Equipment ordering, provisioning, and maintenance may be standardized across departments within the telephone company using exemplary embodiments of the present invention. Exemplary embodiments of the present invention interact and gather data from existing applications to support the timing supplies and assignments services.

Exemplary embodiments of the present invention include an interactive interface between an accounting system, an equipment ordering system, and the synchronized tracking system such that when an order is created for timing equipment using the accounting and ordering systems, a user may be queried to establish the timing assignments for the purchased equipment. If the user responds in the affirmative, he/she is then transferred to the synchronized tracking system application.

Figure 1:
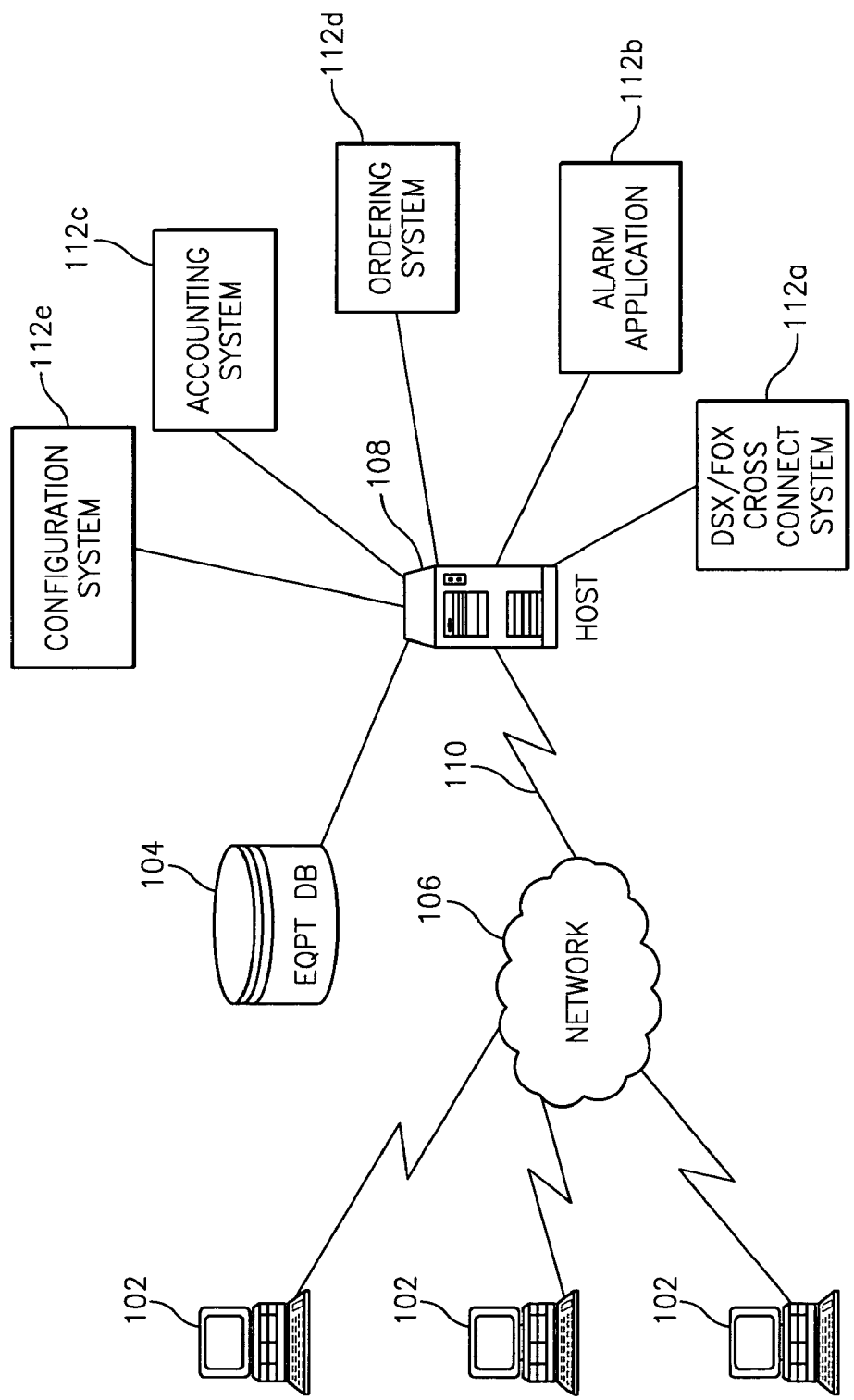
FIG. 1 is a block diagram of a system upon which the synchronized tracking system may be implemented in exemplary embodiments.

In FIG. 1, a block diagram of an exemplary system for maintaining timing supplies and assignments for telecommunications equipment is generally shown. The exemplary system includes a host system 108 for executing a synchronized tracking application. The system in FIG. 1 also includes one or more user systems 102 through which users such as equipment suppliers, service suppliers, purchasing agents and corporate capacity management organization representatives located at one or more geographic locations may contact the host system 108 to initiate the execution of the synchronized tracking application. In exemplary embodiments of the present invention, the host system 108 executes the synchronized tracking application and the user system 102 is coupled to the host system 108 via a network 106. Each user system 102 may be implemented using a general-purpose computer executing a computer program for carrying out the processes described herein. The user system 102 may be a personal computer (e.g., a lap top, a personal digital assistant) or a host attached terminal. If the user system 102 is a personal computer, the processing described herein may be shared by a user system 102 and the host system 108 (e.g., by providing an applet to the user system 102).

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and LAN) so that not all user systems 102 are coupled to the host system 108 through the same network. One or more of the user systems 102 and the host system 108 may be connected to the network 106 in a wireless fashion. In exemplary embodiments of the present invention, the user system 102 is connected to the host system 108 via a network such as a private LAN and the host system 108 executes the synchronized tracking application software.

The storage device 104 depicted in FIG. 1 may be implemented using a variety of devices for storing electronic information. It is understood that the storage device 104 may be implemented using memory contained in the host system 108 or it may be a separate physical device. The storage device 104 may be logically addressable as a consolidated data source across a distributed environment that includes a network 106. The physical data may be located in a variety of geographic locations depending on application and access requirements.

Information stored in the storage device 104 may be retrieved and manipulated via the host system 108. The storage device 104 includes an equipment inventory database. In exemplary embodiments of the present invention, the equipment inventory database is relational and includes central office records and equipment records. These records may also include other kinds of data relating to shelves, cards, ports, and assignments for the aforementioned data. In exemplary embodiments of the present invention, the host system 108 operates as a database server and coordinates access to application data including data stored on storage device 104. Access to data contained in the equipment inventory database may be restricted based on user characteristics.

The host system 108 depicted in FIG. 1 may be implemented using one or more servers operating in response to a computer program stored in a storage medium accessible by the server. The host system 108 may operate as a network server (e.g., a web server) to communicate with the user system 102. The host system 108 handles sending and receiving information to and from the user system 102 and can perform associated tasks. The host system 108 may reside behind a firewall to prevent unauthorized access to the host system 108 and enforce any limitations on authorized access. A firewall may be implemented using conventional hardware and/or software as is known in the art.

The host system 108 may also operate as an application server. The host system 108 executes one or more computer programs to facilitate the synchronized timing equipment process. One or more application programs within the host system 108 share information to support the timing assignments and usage management. The network 110 has the same characteristics described previously for network 106. In exemplary embodiments of the present invention, network 110 is a private LAN network. In alternate embodiments, the network 110 is the same physical network as network 106.

As depicted in FIG. 1, in exemplary embodiments of the present invention, the existing application systems 112 may include: a cross-connect system (112a) for identifying where fiber optic and copper cables terminate as well as identifying spare capacities; an alarm telemetry application (112b) for identifying alarm and monitoring requirements; an accounting system (112c) for tracking expenditures and account codes related to an order; an ordering system (112d) for procuring equipment supplies and parts (e.g., equipment orders may include hardware, software and/or services orders); and a configuration system (112e) for determining the right combination of equipment and services to be ordered. Data and processing may be shared in a real time/interactive mode or they may be shared in a batch mode depending on application requirements and the capabilities of the existing application systems 112a–e. Each of the application systems 112a–e may be executed by one or more computer systems 102 and may be collocated or may be located geographically remote from the other application systems and/or the host system 108.

The processing of the synchronous timing application may be shared by a user system 102 and the host system 108 by providing an application (e.g., java applet) to the user system 102. As previously described, it is understood that separate servers may be utilized to implement the network server functions and the application server functions. Alternatively, the network server, the firewall, and the application server may be implemented by a single server executing computer programs to perform the requisite functions.

Figure 2:
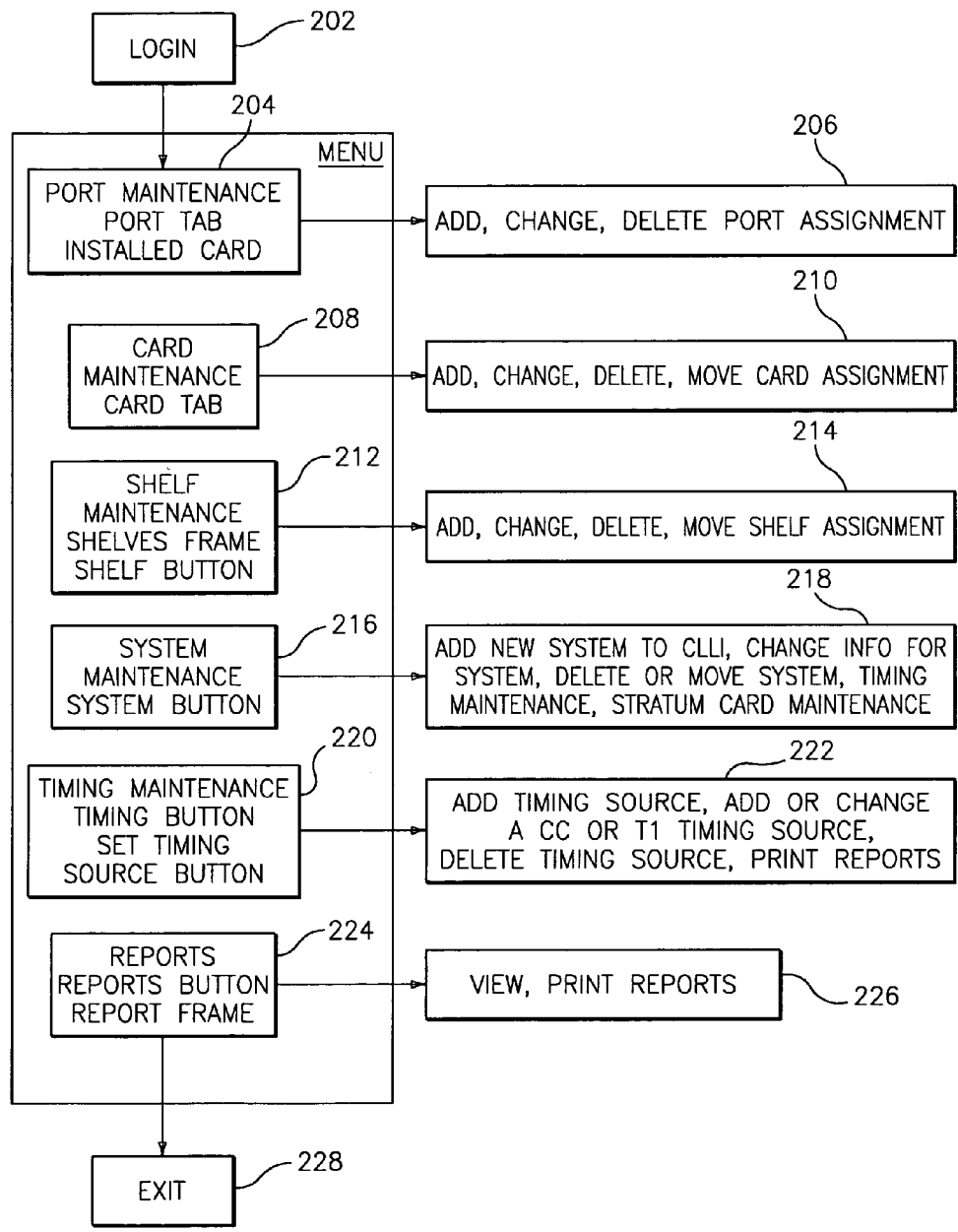
FIG. 2 is flow diagram of a process for maintaining timing supplies and assignments in exemplary embodiments.
Figure 3:
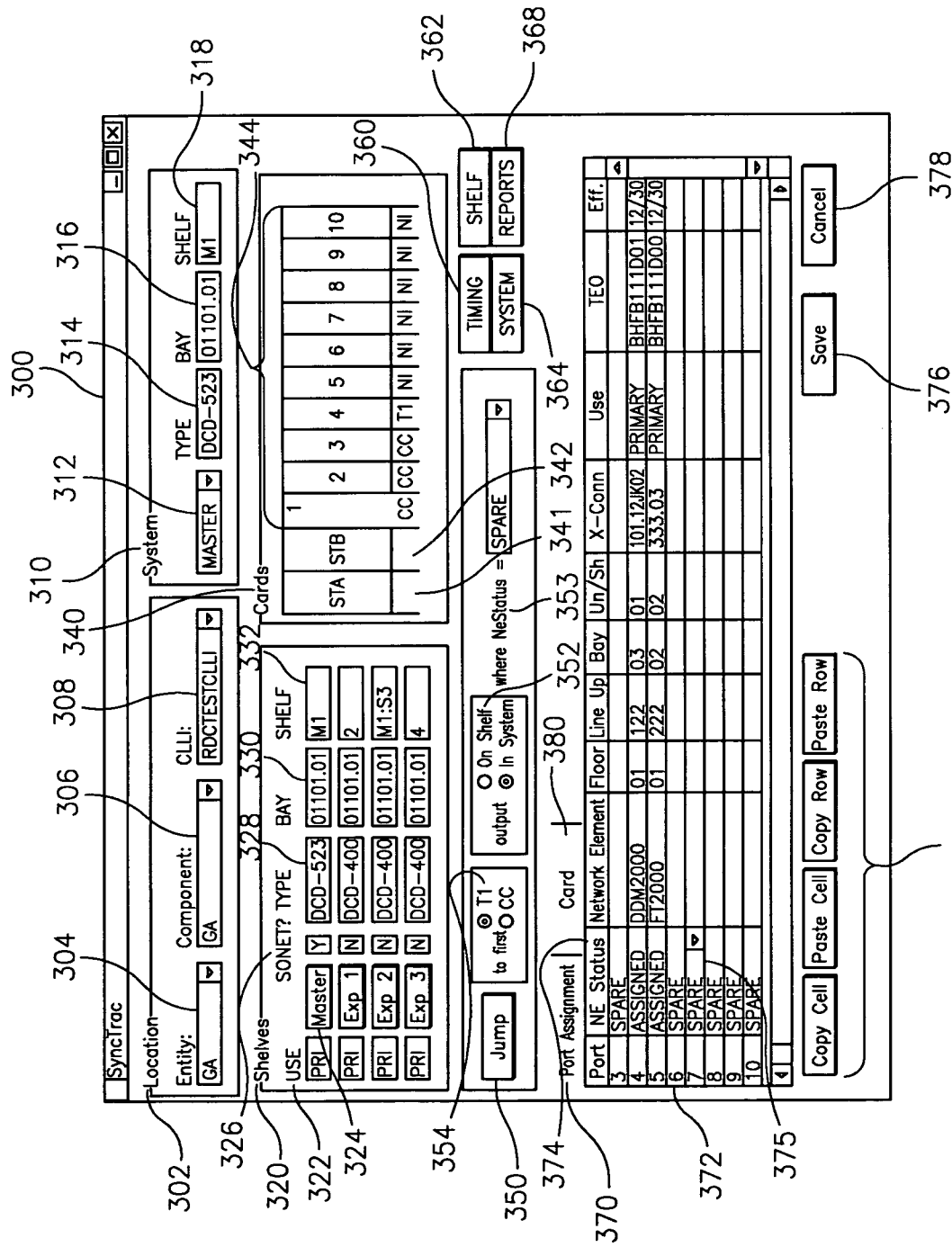
FIG. 3 is a sample main user interface screen of the synchronized tracking system in exemplary embodiments.

FIG. 2 is flow diagram of an exemplary process for managing the timing supplies and assignments for telecommunications equipment. A user logs into the synchronized tracking application at step 202 and a main user interface screen 300 (FIG. 3) is presented upon login. As shown in FIG. 3, the main user interface screen 300 displays system location information in location frame 302, system detail information in system frame 310, shelf information in shelves frame 320, card details in cards frame 340, and port/card information presented via the port assignment tab 370 and card tab 380.

Location frame 302 includes an entity field 304, a component field 306, and a CLLI (Common Language Location Identifier) field 308. An entity refers to a particular company region, state organization, or partial state organization. A component may also refer to a company region, state organization, partial state organization, or may relate to a subset of the aforementioned items. A CLLI refers to a code that identifies the location of system equipment. System frame 310 includes a system field 312, type field 314, bay field 316, and shelf field 318. System field 312 specifies a particular shelf installed in the system. A master shelf refers to the first synchronous timing shelf installed in a system. Multiple shelves may be installed in a system whereby the non-master shelves are referred to as slave shelves. Type field 314 refers to the model and manufacture of the timing system. Bay field 316 specifies a relay rack designation of the installed equipment. Shelf field 318 specifies the shelf designation of the main shelf listed in bay field 316 for the particular system identified in system field 312. System field 312 defaults to the master system with the type information in type field 314 and location information in the bay field 316 and shelf field 318 if the master system is installed in the CLLI. If there are no systems installed in the CLLI, a user has the choice of adding a system assignment or selecting another CLLI. All systems within the CLLI may be included in the system drop down box 312.

Shelves frame 320 defaults to show the shelves in the master system. If another system is selected, the shelves for that system may be shown. Shelves frame 320 lists the shelves associated with a system. Also included in shelves frame 320 is a use field 322, shelf field 324, a SONET field 326, a type field 328, a bay field 330, and a shelf field 332. Values available in the Use field 322 include 'primary', 'secondary', and 'any'. Selecting 'primary' indicates that timing system is the main timing system in that all equipment being timed is run off of the primary system. A secondary timing system is used as a back up system that provides timing if the primary system fails. 'Any' indicates that there is only a single timing source in the office which supplies the primary and secondary feeds to equipment. SONET field 326 specifies whether the timing equipment is SONET equipment. SONET refers to Synchronous Optical Network equipment. Type field 328 is similar to type field 314 and specifies the type designation of type field 314. Bay field 330 is similar to bay field 316 and specifies the bay designation of bay field 316. Shelf field 332 is similar to shelf field 318 and specifies the shelf designation of shelf field 318. A user may view the cards on a shelf by selecting one of the shelf buttons in shelf field 324. If use field 322 indicates a value of 'NI', the related shelf has not been installed. By selecting an 'NI' shelf, the shelf maintenance screen (described further in FIG. 6) is presented in order to install a shelf. Shelves that are installed may have a use of ANY, PRI, or SEC, and show the type of shelf and location. If the master shelf is selected, the cards frame 340 may show the stratum cards (e.g., STA 341, STB 342) for the shelf. Cards labeled 'NI' have not been installed.

The jump feature button 350 enables a user to jump to a specified port 352 in the system (once a system has been chosen), or on the chosen shelf 354 (e.g., to find a spare T1 port in the system, the user selects 'T1' in field 354, 'In System' in field 352, and 'SPARE' in the 'where NeStatus=' field 353, followed by selecting the jump feature button 350).

The copy cell, copy row, paste cell, and paste row buttons 356 enable a user to duplicate a cell or row of an assignment, thereby reducing input time. The timing button 360 causes the synchronized tracking system to display the timing source screen (see FIG. 8) where the user can view, add, delete, or edit timing source assignments for the CLLI. The system button 364 causes the synchronized tracking system to display the system maintenance screen (see FIG. 6) where the user can view, edit, delete, move, or add new system assignments. The shelf button 362 causes the synchronized tracking system to display the shelf maintenance screen (see FIG. 5) where the user may view, edit, delete, or move shelf assignments. If the master shelf is selected, clicking the shelf button 362 results in the synchronized tracking system displaying the system maintenance screen (see FIG. 6). The reports button 368 enables a user to print reports for the synchronized tracking system such as equipment order reports, etc.

Cards frame 340 displays in graphical form the cards associated with a shelf. Cards frame 340 includes a selector for stratum cards (e.g., STA 341, STB 342), and selector buttons for composite clock cards, T-1 cards, and unassigned cards, collectively 344. From this screen 300 of FIG. 3, a variety of functions can be performed. A menu of options provided by main user interface screen 300 include port maintenance, card maintenance, shelf maintenance, system maintenance, timing maintenance, and reporting options.

Returning to FIG. 2, a user may select a port upon which to perform maintenance via the main user interface screen 300 at step 204. The user may add, change, or delete a port assignment at step 206. To add a port assignment, the user clicks on the port tab 370 (unless it is already selected). The user then clicks on an installed card (e.g., 1, 2, 3, 4 of cards 344) of the cards section 340 of screen 300. The port assignment table 372 populates with data for the selected card. The user selects a port from the port assignment table 372. In the row, under the 'NE Status' (Network Element Status) column 374, the user clicks the drop down arrow 375 and selects 'ASSIGNED.' The user then enters the desired information in the remaining columns in the selected row and selects either 'Save' 376 to save the action or 'Cancel' 378 to cancel the action.

A user may alternatively change a port assignment at step 206. The user clicks an installed card (e.g., 1, 2, 3, 4 of cards 344) from the cards section 340 of screen 300. The port assignment table 372 is populated with information relating to the selected card. The user selects a port from the port assignment table 372 by clicking on a row. The user is then able to change the information in the row as desired. The user clicks 'Save' 376 to save the action or 'Cancel' 378 to cancel the action.

Another option available to the user is deleting a port assignment. The user clicks on an installed card (e.g., 1, 2, 3, 4 of cards 344) from cards section 340. The port assignment table 372 populates with the information relating to the selected card. In the applicable row, under the 'NE Status' column 374, the user clicks the drop down arrow 374 and selects 'SPARE'. The synchronized tracking system deletes the information in the row. The user then selects either 'Save' 376 or 'Cancel' 378.

Figure 4:
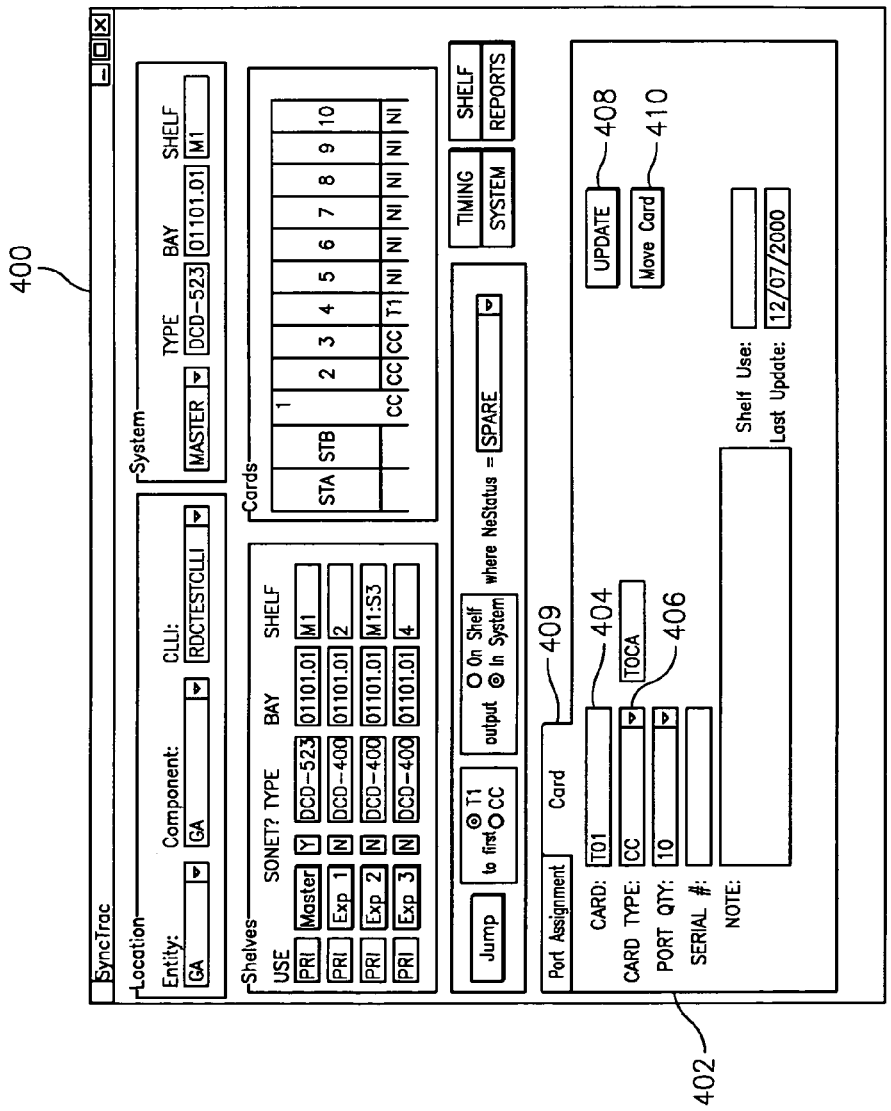
FIG. 4 is a sample user interface screen for performing card maintenance in exemplary embodiments.

A user may perform card maintenance via the main user interface screen 300 at step 208. Card maintenance includes adding, changing, deleting, and moving a card assignment at step 210. To assign a new card to a shelf, the user selects a card that is marked 'NI' (e.g., 5–10 of cards 344) from the cards section 340. The synchronized tracking system displays a user interface screen 400 including a card table 402 of FIG. 4. The user then clicks on the card tab 380 (unless it is already selected). The user enters information relating to the new card in card table 402. The card type drop down box 406 is changed from 'NI' to install a new card. The user then clicks the 'UPDATE' button 408 to save the new card.

To change information for a card, the user may select the card tab 380 of FIG. 3. The user interface screen 400 is presented including the card table 402. In the card table 402 the user changes the information desired and clicks the 'UPDATE' button 408 to save the changes. The user may delete a card by selecting the card tab 380 in FIG. 3 and the user interface screen 400 is presented including the card table 402. The user removes the assignments for the card and changes the value in the card type drop down box 406 to 'NI', followed by clicking the 'UPDATE' button 408 to delete the card.

A user may move a card assignment by selecting the card tab 380 of FIG. 3. The user interface screen 400 is displayed. The user selects the card tab 409 to view the card information in card table 402. The user selects the 'Move Card' button 410. The synchronized tracking system presents a subwindow (not shown) with rows representing cards in the CLLI that are not installed. The subwindow may also include fields for system, location, shelf, and card values. The user selects a row that indicates a location to which the card assignment should be moved and follows the prompts to execution the action.

Referring again to FIG. 2, shelf maintenance is performed at step 212 via the main user interface screen 300. Shelf maintenance includes, e.g., adding, changing, deleting, and moving a shelf assignment at step 214. From the main user interface screen 300, the user clicks a shelf marked 'NI' from the shelves frame 320. According to an exemplary embodiment, the synchronized tracking system presents the shelf maintenance screen 500 of FIG. 5. The user enters the information for a new shelf system in screen 500. To install a new shelf, the user changes the 'Use' drop down box 502 from 'NI' to reflect the use (PRIMARY, SECONDARY, ANY). The user then clicks the 'UPDATE' button 504 to save the new shelf. To change existing shelf information, the user clicks the 'SHELF' button 362 from FIG. 3 and the synchronized tracking system displays the shelf maintenance screen 500. The user changes the information as desired in screen 500, followed by selecting the 'UPDATE' button 504 to save the changes.

To delete a shelf, the user clicks the 'SHELF' button 362 and the synchronized tracking system displays the shelf maintenance screen 500. In the shelf maintenance screen 500, the user removes the assignments for the shelf and changes the 'Use' drop down box 502 to 'NI', followed by selecting 'UPDATE' button 504 to delete the shelf. This will delete all cards for the shelf. A user moves a shelf assignment by selecting the 'SHELF' button 362 from FIG. 3 and the synchronized tracking system displays the shelf maintenance screen 500. In the shelf maintenance screen 500, the user clicks the 'Move Shelf' button 506. The synchronized tracking system presents a subwindow (not shown), which prompts the user to specify whether the shelf assignment should be moved within the existing system or to a different system. If the user selects indicates that the shelf assignment should be moved within the existing system, the synchronized tracking application presents all the shelves in the existing system, along with associated location, system type, and new shelf number fields. The user changes the shelf number in the new shelf number column. If, on the other hand, the user specifies that the shelf assignment should be moved to a different system, the synchronized tracking application presents a listing of available systems within which a shelf assignment may be moved, along with location and shelf fields. The user selects a system to which a card assignment will be moved and follows the prompts to execute the move action.

Figure 6:
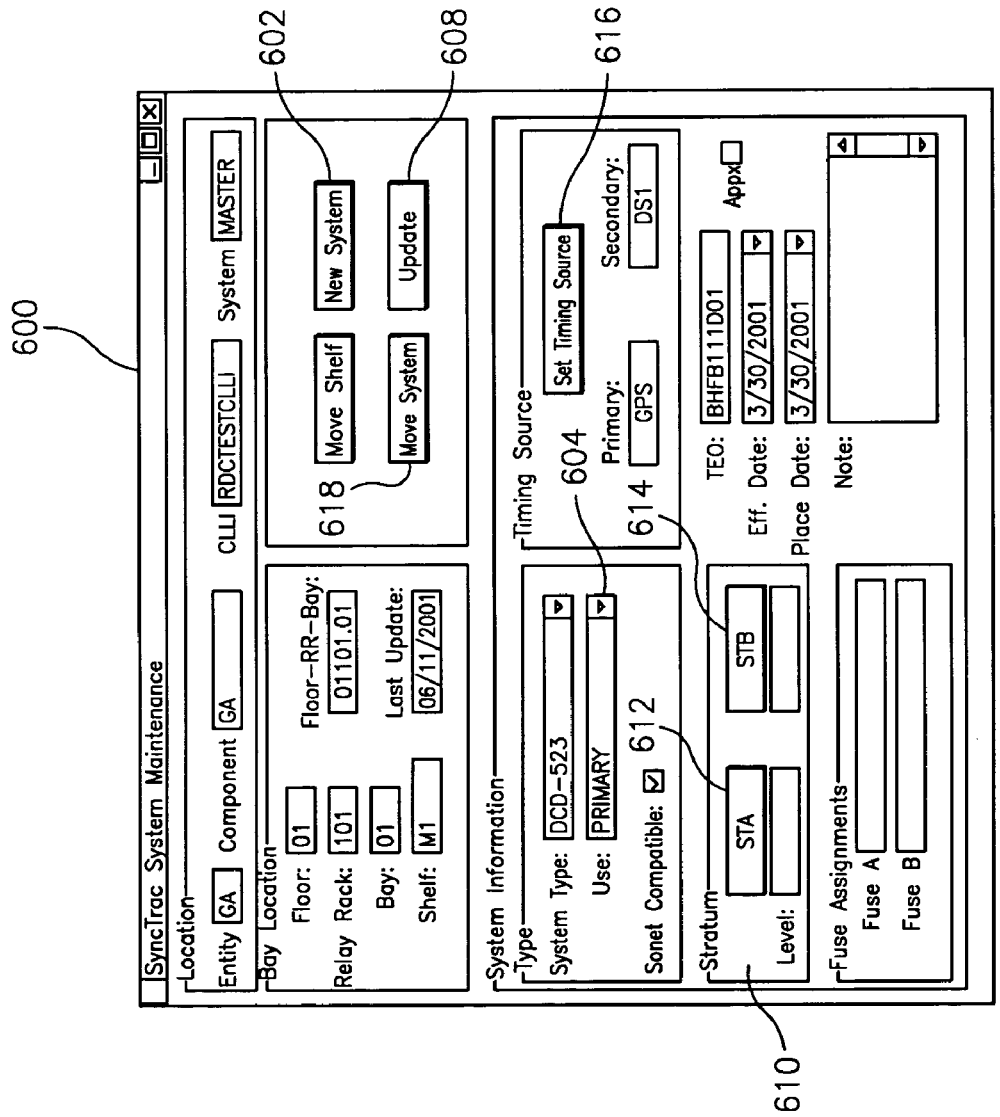
FIG. 6 is a sample user interface screen for performing system maintenance in exemplary embodiments.
Figure 7:
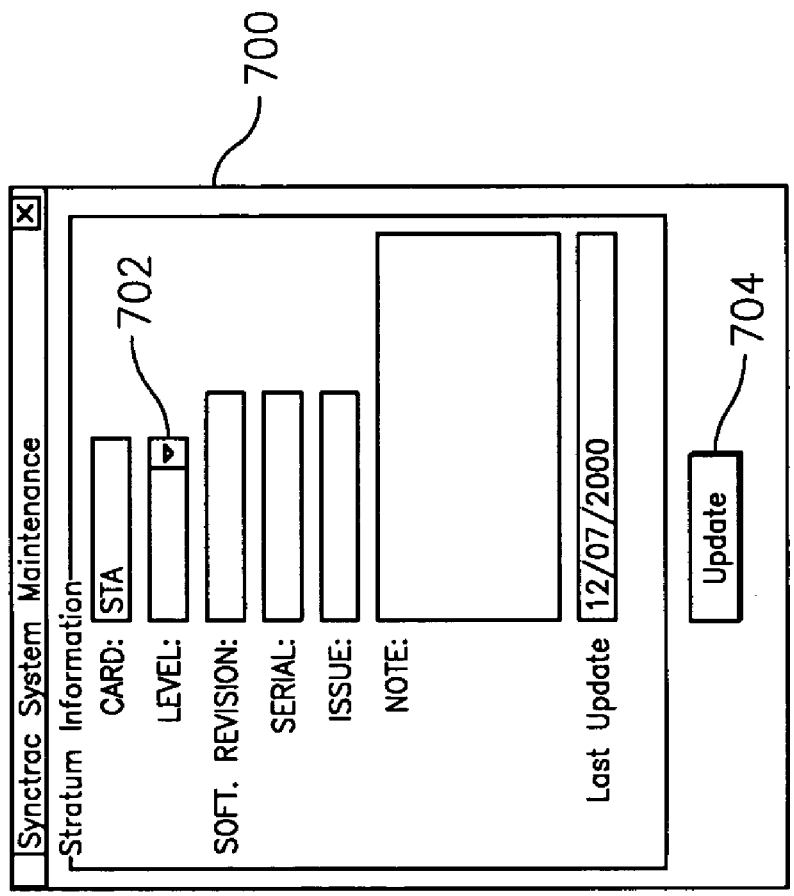
FIG. 7 is a sample user interface screen for performing stratum card maintenance in exemplary embodiments.

A user may perform system maintenance functions at step 216 shown in FIG. 2 via the main user interface screen 300 of FIG. 3. System maintenance functions include assigning a new system to a CLLI, changing existing information for a system, deleting a system, and moving a system at step 218. To add a new system to a CLLI, the user clicks the 'SYSTEM' button 364 from screen 300 and the system maintenance screen 600 of FIG. 6 is displayed. The user selects the 'New System' button 602 and enters the information for the new system in screen 600. The user changes the 'Use' drop down box 604 from 'NI' to install a new system, followed by clicking the 'UPDATE' button 608 to save the new system.

To change information for an existing system, the user clicks the 'SYSTEM' button 364 and the system maintenance screen 600 appears. The desired information to be changed is entered into screen 600. If the change includes a timing source, the user selects the 'Set Timing Source' button 616 and the timing source screen 800 is presented. The user sets the primary and secondary sources via timing source screen 800 and then returns to the system maintenance screen 600. The timing source screen and functions are described further herein. The user selects either the 'STA' button 612 or the 'STB' button 614 in the Stratum section 610 for the selected stratum card. The synchronized tracking system presents the stratum screen 700. Level field 702 specifies one of the standard clock strata of 2, 2E, 3, or 3E. After selecting the level 702 in the stratum screen 700, the user returns to the system maintenance screen 600 and selects the 'UPDATE' button 608 to save the changes.

A user may delete a system via the main user interface screen 300 by clicking the 'SYSTEM' button 364. The system maintenance screen 600 appears. The user removes all assignments, followed by changing the 'Use' drop down box 604 to 'NI', and selecting the 'UPDATE' button 608 to delete the system. This will delete all shelves and cards for the system. To move a system assignment, the user clicks the 'SYSTEM' button 364 and the system maintenance screen 600 appears. The user selects the 'Move System' button 618. The synchronized tracking system presents a subwindow (not shown) that lists the available systems for selection, along with location, system type, and new system number fields. The user changes the system number by entering a number provided for this purpose and follows the prompts to execute the action.

Figure 8:
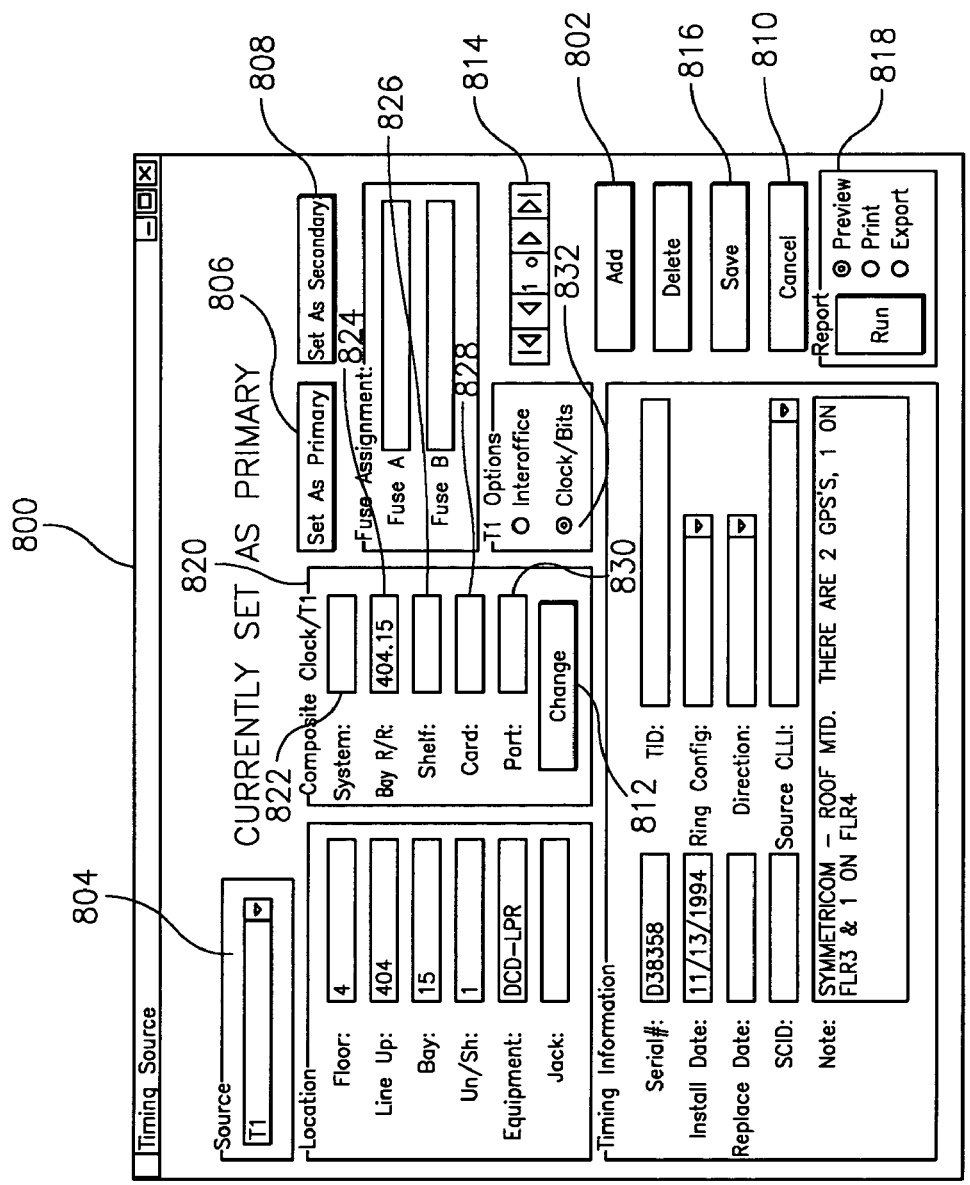
FIG. 8 is sample user interface screen for performing timing maintenance in exemplary embodiments.

A user may maintain timing source information at step 220 via main interface screen 300. Functions include adding, changing, and deleting a T1 or composite clock timing source at step 222. The user may add a timing source by selecting the 'TIMING' button 360 of FIG. 3 or by selecting the 'Set Timing Source' button 616 of FIG. 6. In either event, the timing source screen 800 of FIG. 8 is presented. The user clicks the 'Add' button 802. The user then clicks the 'Source' drop down box 804 and selects a source from the list (e.g., T1 or composite). The user enters information for the source until all pertinent fields are filled. Each source requires different information. Fields not in use may be grayed out in the timing source screen 800. In order to set the source as a primary source for the system, the user clicks on the 'Set As Primary' button 806. In order to set the source as a secondary source for the system, the user clicks the 'Set As Secondary' button 808. The user saves the entries by clicking on 'Save' 810.

Figure 9A:
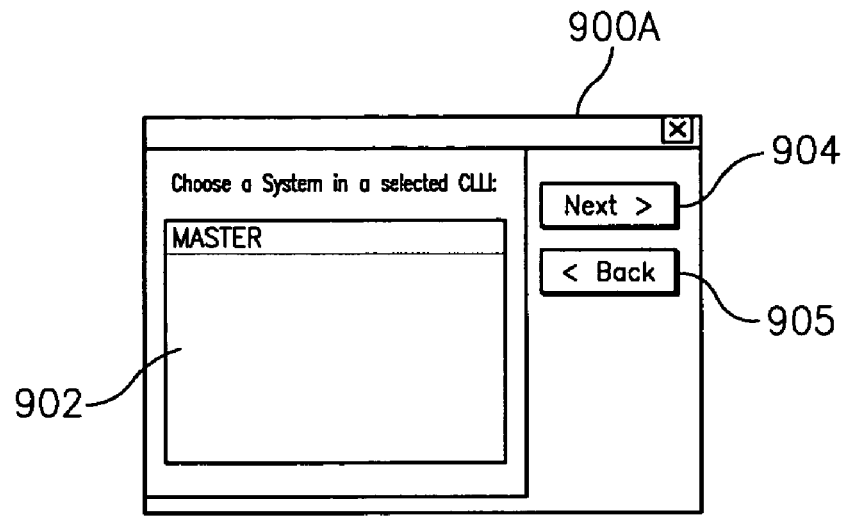
FIGS. 9A–9D are sample user interface screens for performing composite clock and T1 timing maintenance in exemplary embodiments.
Figure 9B:
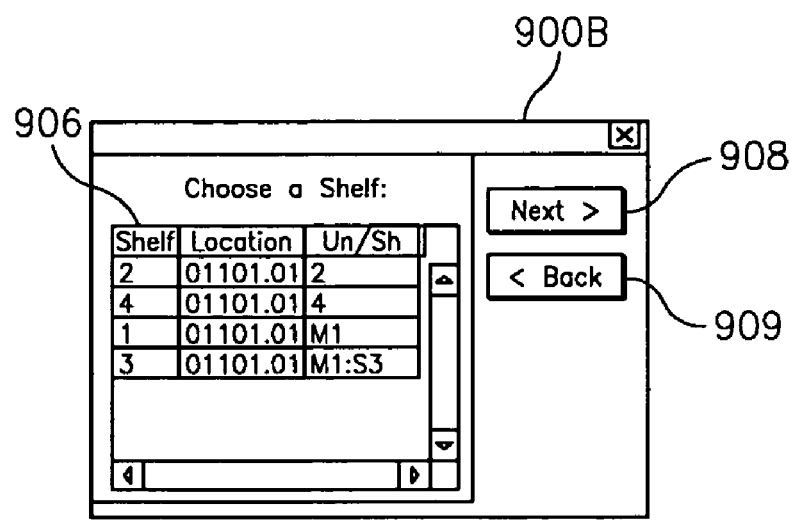
Figure 9C:
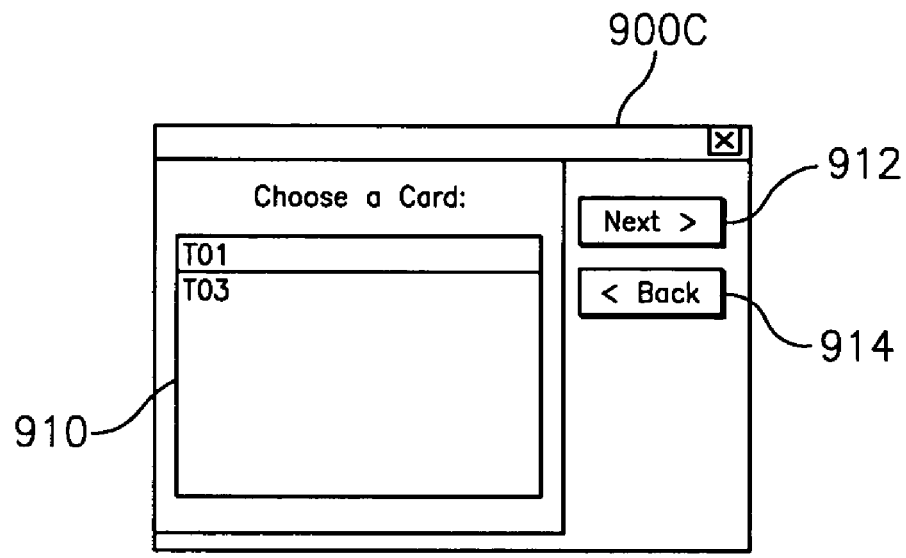
Figure 9D:
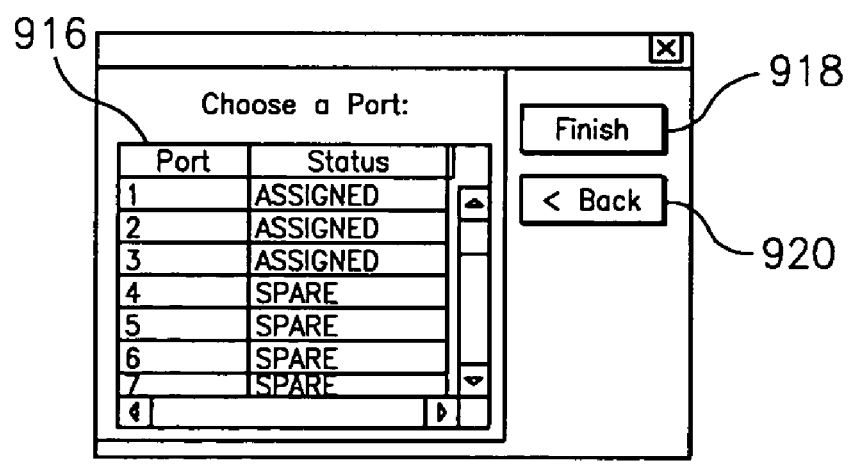

As indicated above, a user may change a composite clock or T1 timing source. This may be accomplished by selecting the 'TIMING' button 360 in FIG. 3, or alternatively, by selecting the 'Set Timing Source' button 616 from FIG. 6. In either case, the timing source screen 800 appears. To change a T1 timing source, the user selects 'clock/bits' option 832 from the T1 Options section of timing source screen 800. Note that the Source field 804 must display 'T1'. The synchronized tracking system presents the timing clock screen 900A of FIG. 9. The user selects a system from the system window 902 (e.g., Master), followed by selecting either 'Next>' 904 to continue on, or '<Back' 905 to return to the previous screen 800. If the user proceeds on by selecting 'Next>' 904, the clock shelf screen 900B of FIG. 9B is presented. The user selects a shelf from the shelf column 906, followed by 'Next>' 912 to proceed forward or '<Back' 914 to revert to the previous screen 900A. If the user selects 'Next>' 912, the clock card screen 900C of FIG. 9C is presented. The user selects a card from the card window 910 (e.g., T01 or T03). The user then either proceeds forward by selecting 'Next>' 912 or reverts back to the previous screen by selecting '<Back' 914. If the user chooses to move forward by selecting 'Next>' 912, the composite clock port screen 900D of FIG. 9D is presented. The user selects a port from the port column 916 completes the action by selecting 'Finished' 918. Alternatively, the user may revert to the previous screen by selecting '<Back' 920.

To change a composite clock timing source, the user selects the 'Change' button 812 and the timing clock screen of 900A is presented. The user then follows the prompts as described above with respect to FIGS. 9A–9D.

The user may also change an existing timing source (or alternatively, delete a timing source) by selecting the TIMING button 360 from FIG. 3 or by manipulating the arrows 814 on either side of the '1' to navigate to a timing source. If the user is changing an existing timing source, the user then makes the desired changes. If the user is deleting a timing source, the user selects the 'Delete' button 816. The action is saved by selecting the 'Save' button 810.

If the user is interested in acquiring a report, the user selects the 'REPORTS' button 368 from FIG. 3 at step 224, or may alternatively, access the 'Report' frame 818 via timing source screen 800 of FIG. 8. If the user selects 'REPORTS' button 368, a report frame similar to that depicted in frame 818 is presented. The user may preview, print, and/or export a report via the radio buttons presented in frame 818 at step 226.

Once the user has completed the desired actions, the main user interface screen 300 is exited by selecting the 'X' button 380 from the toolbar at step 228.

As indicated above, the synchronized tracking system provides a standardized process for performing planning, equipment assignments, and usage tracking for synchronization timing equipment such as those deployed in a central office of a telecommunications network environment. The method may be utilized by capacity management organizations to plan and manage equipment used in central offices, agencies contracted by the telephone company to perform work activities that have been outsourced, organizations within the telephone company for utilizing the look-up and search capabilities of exemplary embodiments of the present invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for managing clock timing assignments and usage, comprising:

selecting a timing source from a selection of timing equipment associated with telecommunications equipment, the timing source selected from one of a composite clock card and a T1 card; and performing a function on the timing source by entering desired information, the function including at least one of:

an assignment;

tracking usage; and search and analysis;

wherein said assignment includes at least one of:

adding a new timing soure;

changing an existing timing source; and deleting a timing source; and wherein further said adding a new timing source includes:

assigning at least one of a primary and secondary label to the timing source;

entering location data for the assignment;

entering timing source data; and entering fuse assignment data; and wherein further the timing source data includes a serial number, an install date, a replace date, a ring configuration, a direction, and a source common language location identifier.

2. The method of claim 1, wherein the location data includes a floor, a line up, a bay, a shelf, an equipment, and a jack.

3. The method of claim 1, wherein the timing source data includes a system, a bay, a shelf, a card, and a port.

4. The method of claim 1, wherein the changing an existing timing source includes selecting at least one of a system, clock shelf, card, and port to which the changing will be executed.

5. The method of claim 1, wherein the performing a function on the timing source equipment further includes generating a report.

6. A storage medium including machine-readable program code for managing clock timing assignments and usage, the program code including instructions for causing a host system to implement a method, comprising:

selecting a timing source from a selection of timing equipment associated with telecommunications equipment, the timing source selected from one of a composite clock card and a T1 card; and performing a function on the timing source in response to information inputted by a user system in communication with the host system, the function including at least one of:

an assignment;

tracking usage; and search and analysis;

wherein said assignment includes adding a new timing source, the adding a new timing source including entering timing source data, wherein the timing source data includes a serial number, an install date, a replace date, a ring configuration, a direction, and a source common language location identifier.

* * * * *